United States Patent Office 3,402,158
Patented Sept. 17, 1968

3,402,158
SULFUR- AND PEROXIDE-VULCANIZABLE INTER-
POLYMERS OF A LOWER ALKYL ACRYLATE,
DICYCLOPENTADIENE, AND A POLYENE CON-
TAINING FROM 2 TO 4 EXOCYCLIC OLEFINIC
BONDS
Anthony F. Santaniello, Trenton, N.J., and Marina N.
Gillis, Morrisville, Pa., assignors to Thiokol Chemical
Corporation, Bristol, Pa., a corporation of Delaware
No Drawing. Filed Sept. 18, 1963, Ser. No. 309,887
8 Claims. (Cl. 260—80.81)

ABSTRACT OF THE DISCLOSURE

The interpolymerization of a major amount of a lower alkyl acrylate with minor amounts of dicyclopentadiene and a polyene containing from 2 to 4 exocyclic olefinic bonds per monomer molecule yields a series of sulfur- and peroxide-vulcanizable interpolymers having controllable and relatively high plasticities or viscosities at the high molding temperatures generally useful to cure these interpolymers. Upon vulcanization, these interpolymers are converted to elastomers having excellent physical properties.

---

This invention relates to sulfur and peroxide curable interpolymers formed from lower alkyl acrylates, polyenes and dicyclopenatadiene. This invention also relates to the curable compositions prepared from these interpolymers and to their elastomeric vulcanizates.

Prior art acrylate interpolymers are conventionally curable only with amine-type curing catalysts, most of which are toxic and corrosive. Precautions are needed to prevent toxemia or dermatitis due to contact with said curing agents, and use of highly polished plated molds is needed to minimize the excessive corrosion that is usually associated with the use of such curing agents. Another quality characteristic of many prior art acrylates is a rapid falling off of viscosity or plasticity with temperature increase. At the higher temperatures required for cure during the molding process, these interpolymers are often too fluid, and before solidifying by cure may develop pocking, blistering or pores which are undesirable in molded products.

An object of this invention is to provide novel sulfur and peroxide curable acrylate interpolymers.

Another object of this invention is to provide novel interpolymers of acrylate esters, polyenes and dicyclopentadiene which have high and controllable viscosity at high temperatures.

Yet another object of this invention is to provide novel non-toxic and non-corrosive curable compositions of interpolymers of acrylate esters, polyenes and dicyclopentadiene with sulfur or peroxide curing agents.

A further object of this invention is to provide sulfur-cured and peroxide-cured vulcanizates from interpolymers of acrylate esters, polyenes and dicyclopentadiene.

Other objects of this invention are implicit in or will become apparent from the following explanations and examples.

Unexpectedly it has been discovered that novel and improved curable acrylate interpolymers are provided by the interpolymerization of lower alkyl acrylate esters with at least 0.01 weight percent of polyenes and at least 0.5 weight percent of dicyclopentadiene. These interpolymers may be admixed with sulfur or peroxide curing agents and conventional adjuvants to form novel curable acrylate crude rubber compositions which are relatively non-toxic and non-corrosive. The curable compositions have other desirable characteristics, such as controllable and relatively high plasticities or viscosities at the high molding temperatures ordinarily used in cure processes. Further, the curable compositions may be used in ordinary steel molds which do not have to be specially polished and plated such as are required for use with prior art curable acrylate compositions. Upon cure, the present novel vulcanizates are produced which are elastomers with excellent physical properties.

In general, the interpolymers of this invention are produced by free radical interpolymerization of about 60 to 99.5 weight percent of lower alkyl acrylate esters, with up to about 30 weight percent of acrylonitrile, with 0.01 to 1.5 weight percent of polyenes and with 0.5 to 10 weight percent of dicyclopentadiene. Conventional peroxide, persulfate or azo type initiator catalysts may be used in the interpolymerization processes. Benzoyl peroxide and azobisisobutyronitrile are the preferred initiators. The monomers may be polymerized using solution, suspension, emulsion, or bulk polymerization processes. The initiator catalyst may be added to the monomers either in a single charge, or in increments, or continuously, to initiate polymerization. Adjuvants used in the polymerization procedure may also be added, such as suspending agents which prove useful in suspension procedures, to facilitate handling or processing. The order of addition of monomers, initiators and adjuvants to one another is as is usually employed in the art for the specific polymerization technique chosen. Polymerization is facilitated by heating and agitation and proceeds until the desired interpolymers have formed. The preferred method is suspension polymerization. With such a system the interpolymerization may be conducted in about 2 to 5 hours at about 85 to 95° C.

The lower alkyl acrylates which are usefully employed in the present invention are esters of acrylic acid and lower alkanols. These acrylate esters may be used singly or in combination with one another to make up from about 60 to 99.5 weight percent of the total monomer charge in the interpolymerization process. Of the lower alkanols both normal and branched chain alcohols may be used, and preferably those which have up to a total of about 8 carbon atoms per molecule. Thus, preferred acrylates formed therefrom and employed herein have either normal or branch-chained alkyl ester groups, and include in their number ethyl acrylate, propyl acrylate, isopropyl acrylate, n-butyl acrylate, isobutyl acrylate, sec.-butyl acrylate, tert.-butyl acrylate, and the isomeric forms of pentyl, hexyl, heptyl and octyl acrylates, and in the latter instance most preferably 2-ethylhexyl acrylate.

Acrylonitrile may be used to replace a portion of the lower alkyl acrylate esters ordinarily employed, and in quantities of up to 30 weight percent of the total of monomers charged. Acrylonitrile, where used, has the effect of imparting to the present elastomeric vulcanizates a somewhat greater hardness, higher torsional modulus $G_{10,000}$ temperature, and increased solvent swell resistance to oils than do vulcanizates produced from otherwise identical interpolymers containing no acrylonitrile.

The polyene monomers are usefully employed in quantities of 0.01 to 1.5 percent by weight of the monomer charge to prepare the present interpolymers. These very small portions of polyene monomers are effective in providing high and controllable viscosity properties to the instant interpolymers at the high temperatures used in the molding cure process. They appear to reduce excessive fluidity of the interpolymers to a degree relative to the quantity and types of polyenes used.

The polyene monomers used to form the present interpolymers are monomeric materials containing at least two carbon-to-carbon double bond linkages and include allylic polyene monomers, vinyl polyene monomers and mixed polyene monomers which contain from 2 to 4 vinyl and/or allylic unsaturated groups per molecule. The mixed polyene monomers which may be used contain both vinyl and allylic groups. The present polyenes are further distinguished by the attribute that the reactive unsaturated groupings within any one molecule are non-conjugated with respect to one another.

Table I presents some representative allylic polyene monomers which may be usefully employed in the present invention.

TABLE I.—ALLYLIC POLYENE MONOMERS

Allylic diene monomers allyl beta-allyloxypropionate
diallyl ether
allyl diglycol carbonate
allyl glycol ether
diallyl adipate
diallyl amine
diallyl azelate
diallyl carbonate
diallyl diglycolate
diallyl isosebacate
diallyl homophthalate
diallyl malonate
N,N-diallyl melamine
diallyl nadic ester
trimethylol propane diallyl ether
diallyl oxalate
diallyl phthalate
diallyl isophthalate
diallyl terephthalate
N,N-diallyl piperazine
diallyl sebacate
diallyl suberate
diallyl succinate
diallyl sulfide

Allylic triene monomers trimethylol propane triallyl ether
triallyl aconitate
triallyl amine
triallyl borate
triallyl citrate
triallyl cyanurate
triallyl phosphate

Allylic tetraene monomers tetraallylmethylene diamine
pentaerythritol tetraallyl ether Table II presents some representative vinyl polyene monomers of the acrylate type which may be usefully employed in the present invention.

TABLE II

Diene monomers acrylic anhydride
calcium acrylate
ethylene diacrylate
magnesium acrylate
tetramethylene diacrylate
zinc acrylate
2-butene-1,4 diol diacrylate
ethylene glycol-2,2'-dicyanoacrylate
neopentyl glycol-2,2'-dicyanoacrylate

Triene monomers glyceryl triacrylate

Table III presents some representative vinyl polyene monomers of the methacrylate type which may be usefully employed in the present invention.

TABLE III

Diene monomers

Bisphenol "A" dimethacrylate
2,4-dimethylhexanediol-2,5-dimethacrylate
ethylene dimethacrylate
magnesium methacrylate
methacrylic anhydride
neopentyl glycol dimethacrylate
tetramethylene dimethacrylate
triethylene glycol dimethacrylate
zinc methacrylate
dimethyl propane dimethacrylate
diethylene glycol dimethacrylate
butyne dimethacrylate
butane dimethacrylate
cyclohexane dimethanol dimethacrylate
butene dimethacrylate
lead dimethacrylate

Triene monomers glyceryl trimethacrylate
trimethylol propane trimethacrylate
trimethacrylate of isocyanurate

Tetraene monomers pentaerythritol tetramethacrylate

Table IV presents some other representative vinyl polyene monomers which may be usefully employed in the present invention.

TABLE IV

Diene monomers 2,5-dimethylhexanediene-1,5
divinyl benzene
divinyl sulfide
divinyl sulfone
divinyl oxalate
N,N methylene-bisacrylamide Table V presents some representative polyene monomers of mixed types, that is those polyenes which contain at least one unsaturated group from at least two of the types found useful herein.

TABLE V

Mixed allyl and vinyl diene monomers allyl acrylate
allyl methacrylate
N-allyl acrylamide
allyl methacrylamide
methallyl acrylate
methallyl methacrylate
vinyl acrylate
vinyl methacrylate
allyl vinyl ether
chloroallyl acrylate

Mixed allyl and vinyl triene monomers

N,N-diallylacrylamide
N,N-dimethallylacrylamide
diallyl itaconate

Dicyclopentadiene is usefully employed in quantities of 0.5 to 10 percent by weight of the total monomer charge to prepare the present interpolymers. Sulfur curable compositions of the present invention may use interpolymers formed with as little as 0.5% dicyclopentadiene to provide vulcanizates with excellent physical properties; however, peroxide curable compositions of the present invention usually require use of interpolymers formed with at least 1% dicyclopentadiene to provide vulcanizates with good physical properties.

Curable compositions of the present invention are provided by intimate mixture, as on a rubber mill or in an internal mixer, of the present interpolymers with sulfur or peroxide curing agents. Sulfur curing agents are used in such quantities so as to provide from 0.2 to 5 parts by weight of sulfur per 100 parts of interpolymer. Peroxide curing agents are used in such quantities so as to provide from $5 \times 10^{-2}$ to $2.5 \times 10^{-1}$ parts by weight of available oxygen per 100 parts of interpolymer. Preferred curing agents are elemental sulfur and dicumyl peroxide.

Adjuvant materials which may be employed in preparing curable compositions according to the present invention include conventional cure accelerators, reinforcing and/or pigmenting fillers, plasticizers, etc.

Curing of the present curable compositions is carried out at elevated temperatures, say from 250 to 450° F., in intervals of say from 1 minute to 75 hours, the lower temperatures requiring the longer time intervals.

Specific embodiments of this invention are presented in the following examples which illustrate modes of practice of the invention but are not intended to act as a limitation on the scope thereof.

EXAMPLE 1

A reactor was charged with 2,300 g. of hot water, into which was dissolved 69 g. of a 15% aqueous solution of polyacrylic acid, a suspending agent (Alcogum). The solution was then permitted to cool to ambient temperatures. There was then charged to the solution 74 parts by weight (148 g.) of butyl acrylate, 25 p.b.w. (50 g.) of acrylonitrile, 1 p.b.w. (2 g.) of dicyclopentadiene and 0.5 p.b.w. (1 g.) of allyl methacrylate. The temperature of mixture was raised to refluxing temperatures of about 86° to 92° C. A charge was made of 0.96 ml. of a benzene solution containing $3.58 \times 10^{-3}$ g./ml. of azobisisobutyronitrile initiator catalyst at the onset of reflux, and of five 0.72 ml. portions at 22 minute intervals thereafter. During this period the temperature was maintained at 92° C. At 132 minutes after onset of refluxing, as above, the pot mixture was cooled with ice. The interpolymer formed was salted out of the product mixture as a solid by addition of quantities of water and sodium chloride thereto. The interpolymer was separated from the liquid portions by filtration, washed with hot water, and dried under vacuum for about 66 hours at 65° C. to remove volatiles. Some 76.3 g. of interpolymer product in the form of white beads were recovered which exhibited a Mooney viscosity at 212° F. of 64.

A curable crude rubber composition was formed by milling together 100 p.b.w. of the interpolymer formed as above, 1 p.b.w. of stearic acid, 40 p.b.w. of Philblack A carbon black and 5 p.b.w. of Di-cup 40C, which is 40% by weight of dicumyl peroxide. The sheeted curable crude rubber thus prepared was press cured at 2000 p.s.i. and 320° F. for 45 minutes. A portion of the press cured material was tested for physical properties and another portion of the press cured material was further cured for 70 hours at 302° F. prior to its testing. The properties obtained are as listed.

EXAMPLE 2

|  | 45'/320° F. | +70 h./302° F. |
|---|---|---|
| Ultimate tensile strength in p.s.i. | 1,035 | 1,000 |
| Ultimate elongation in percent | 120 | 140 |
| Modulus (100%) in p.s.i. | 640 | 580 |
| Hardness in Shore A durometer degrees | 39 | 50 |

An interpolymer was prepared as described in Example 1 using 86.7 p.b.w. (435.5 g.) of butyl acrylate, 12.3 p.b.w. (61.5 g.) of acrylonitrile, 1 p.b.w. (5 g.) of dicyclopentadiene and 0.5 p.b.w. (2.5 g.) of allyl methacrylate in 1,500 g. of water and 28.8 g. of Alcogum. A charge of 3.2 ml. of azobisisobutyronitrile in benzene, $1.1 \times 10^{-2}$ g./ml., was made at onset of reflux, and of five 2.56 ml. portions at 22 minute intervals thereafter. The interpolymer product obtained thereby had Mooney viscosities of 61 at 212° F. and 54 at 295° F. An interpolymer of the prior art formed with 88% butyl acrylate and 12% acrylonitrile had Mooney viscosities of 40 at 212° F. and 23 at 295° F.

A curable crude rubber composition was prepared with the polymer made above according to the recipe and method of Example 1. The properties of the vulcanizates produced upon cure at 2000 p.s.i. and 340° F. for five minutes (5'/340° F.), and further cure for an additional 5 hours at 350° F. (+5 h./350° F.) are as listed below.

|  | 5'/340° F. | +5 h./350° F. |
|---|---|---|
| Ultimate tensile strength in p.s.i. | 680 | 795 |
| Ultimate elongation in percent | 90 | 125 |
| Modulus (100%) in p.s.i. | | 555 |
| Hardness in Shore A durometer degrees | 54 | 48 |

EXAMPLE 3

An interpolymer was prepared as described in Example 1 with 92 p.b.w. (828 g.) of ethyl acrylate, 8 p.b.w (72 g.) of dicyclopentadiene and 1 p.b.w. (9 g.) of allyl acrylate in 2,700 g. of water containing 51.8 g. of Alcogum. A charge of 6 ml. of azobisisobutyronitrile in benzene, $1.06 \times 10^{-2}$ g./ml., was made at onset of reflux, and of five 4.8 ml. portions at intervals of 22 to 29 minutes thereafter. The interpolymer obtained was isolated in 62% yield and tested for Mooney viscosity, producing values of 63 at 212° F. and 44 at 295° F. An interpolymer formed from 92 p.b.w. of ethyl acrylate and 8 p.b.w. of dicyclopentadiene had Mooney viscosity values of 29 at 212° F. and 16 at 295° F.

A curable crude rubber composition was formed according to the recipe and method described in Example 1, and cured at 2000 p.s.i. and 320° F. for 30 minutes to yield a vulcanizate with elastomeric properties as listed.

Ultimate tensile strength, in p.s.i. _____ 1000
Ultimate elongation, in percent _____ 93
Hardness, in Shore A durometer degrees _____ 62

EXAMPLE 4

An interpolymer was formed substantially according to the method of Example 1 from 99.5 p.b.w. (497.5 g.) of ethyl acrylate, 0.5 p.b.w. (2.5 g.) of dicyclopentadiene and 0.02 p.b.w. (0.1 g.) of allyl methacrylate in 1,500 g. of water and 28.8 g. of Alcogum. A charge of 1.6 ml. of azobisisobutyronitrile in benzene, $1.1 \times 10^{-2}$ g./ml., was made at onset of reflux, and of five 1.28 ml. portions at 22 minute intervals thereafter. The interpolymer obtained was isolated in 81.8% yield and showed Mooney viscosity values of 77 at 212° F. and 65 at 295° F.

The interpolymer produced above was compounded with sulfur according to the recipe

|  | P.b.w. |
|---|---|
| Interpolymer | 100 |
| Stearic acid | 1 |
| Philblack A (carbon black) | 40 |
| Zinc oxide | 5 |
| Altax (benzothiazyl disulfide) | 1 |
| Ethyl Tellurac (tellurim diethyldithiocarbamate | 1 |
| Sulfur | 1.5 | to provide a curable crude rubber composition. Cure was then effected at 2000 p.s.i. and 320° F. for 40 minutes to give a vulcanizate having the properties listed below:

Ultimate tensile strength, in p.s.i. _____ 575
Ultimate elongation, in percent _____ >1,100
Hardness, in Shore A durometer degrees _____ 50

The vulcanizate was further heated at 300° F. for 24 hours to yield a tensile strength of 778 p.s.i., an elongation of 940% and a Shore A hardness of 55. After further heating for 70 hours at 302° F., the tensile strength rose to 1205 p.s.i., the elongation was 725% and the hardness increased slightly to 59 durometer degrees.

EXAMPLE 5

An interpolymer was formed as in Example 1 with 90 p.b.w. (360 g.) of ethyl acrylate, 10 p.b.w. (40 g.) of dicyclopentadiene and 0.06 p.b.w. (0.24 g.) of allyl acrylate in 1,200 g. of water containing 23.04 g. of Alcogum. Interpolymerization was catalyzed with azobisisobutyronitrile initiator catalyst in benzene solution, $1.184 \times 10^{-2}$ g./ml. Five equal portions of initiator solution were charged at 25 to 37 minute intervals after onset of reflux for a total of 0.1421 g. of catalyst. The interpolymer was isolated as in Example 1 and compounded with dicumyl peroxide to provide a curable composition, and then cured according to the methods and recipe of Example 1 to produce a vulcanizate having a tensile strength of 1240 p.s.i., an elongation of 240% and a haddness of 62 durometer degrees.

EXAMPLE 6

An interpolymer was prepared from 95 p.b.w. of ethyl acrylate, 5 p.b.w. of dicyclopentadiene and 0.1 p.b.w. of allyl methacrylate according to the method of Example 1. The isolated product was obtained in 71% yield, and showed Mooney viscosity values of 52 at 212° F. and 33 at 295° F. Mooney viscosity values of an interpolymer made from 95 p.b.w. of ethyl acrylate and 5 p.b.w of dicyclopentadiene were 41 at 212° F. and 25 at 295° F.

The interpolymer prepared above was isolated and compounded with dicumyl peroxide and also with sulfur to provide curable crude rubber compositions according to the method and recipes of Examples 1 and 4 respectively. The curable crudes were then cured to form vulcanizates as shown below:

|  | Compositions Vulcanized With | |
|---|---|---|
|  | Peroxide | Sulfur |
| Cure time at 2,000 p.s.i. in minutes | 5 | 40 |
| Cure temperature in ° F | 340 | 320 |
| Tensile strength in p.s.i | 1,000 | 1,400 |
| Elongation in percent | 360 | 500 |
| Hardness in Shore A durometer degrees | 42 | 64 |

We claim:

1. Sulfur- and peroxide-vulcanizable normally solid interpolymers characterized by a high Mooney viscosity at 212° F. and having a molecular structure which consists essentially of (a) from about 60 to about 99.5 percent by weight of randomly recurring groups derived from a lower alkyl acrylate, (b) from 0 to about 30 percent by weight of randomly recurring groups derived from acrylonitrile, (c) from 0.5 to 10 percent by weight of randomly recurring groups derived from dicyclopentadiene, and (d) from 0.01 to 1.5 percent by weight of randomly recurring groups derived from an allyl acrylate having a structure represented by the formula

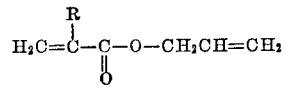

where R represents a substituent selected from the group consisting of hydrogen and methyl.

2. An interpolymer of claim 1 obtained by copolymerizing a monomer mixture consisting essentially of about 73 percent by weight of butyl acrylate, about 24 percent by weight of acrylonitrile, about .99 percent by weight dicyclopentadiene and about .49 percent by weight allyl methacrylate.

3. An interpolymer of claim 1 obtained by copolymerizing a monomer mixture consisting essentially of about 86 percent by weight butyl acrylate, about 12 percent by weight acrylonitrile, about .99 percent by weight dicyclopentadient and about .49 percent by weight allyl methacrylate.

4. An interpolymer of claim 1 obtained by copolymerizing a monomer mixture consisting essentially of about 91 percent by weight ethyl acrylate, about 7.9 percent by weight dicyclopentadiene and about .99 percent allyl acrylate.

5. An interpolymer of claim 1 obtained by copolymerizing a monomer mixture consisting essentially of about 89 percent by weight ethyl acrylate, about 9.9 percent by weight dicyclopentadiene and about .05 percent by weight allyl acrylate.

6. An interpolymer of claim 1 obtained by copolymerizing a monomer mixture consisting essentially of about 94 percent by weight ethyl acrylate, about 4.9 percent by weight dicyclopentadiene and about .09 percent by weight allyl methacrylate.

7. Sulfur- and peroxide-vulcanizable interpolymers according to claim 1, in which the alkyl acrylate is ethyl acrylate.

8. Sulfur- and peroxide-vulcanizable interpolymers according to claim 1, in which the alkyl acrylate is butyl acrylate.

References Cited

UNITED STATES PATENTS

| 2,449,612 | 9/1948 | Mast et al. | 260—80.5 |
| 2,643,247 | 6/1953 | Fisher et al. | 260—85.5 |
| 2,689,232 | 9/1954 | Gerhart | 260—83.5 |

JAMES A. SEIDLECK, *Primary Examiner.*